United States Patent [19]
Sheely

[11] Patent Number: 5,350,093
[45] Date of Patent: Sep. 27, 1994

[54] CARGO BINDER

[76] Inventor: Shawn M. Sheely, 832 24th Ave. S.E., Minneapolis, Minn. 55414

[21] Appl. No.: 931,161

[22] Filed: Aug. 25, 1992

[51] Int. Cl.$^5$ ............................................. B62J 11/00
[52] U.S. Cl. ................................... 224/34; 224/32 A; 224/919
[58] Field of Search ................... 224/34, 39, 328, 318, 224/319, 32 A, 32 R, 30 R, 91 Q; 150/154, 167; 206/597; 410/97, 117; 296/100, 78.1

[56] References Cited

U.S. PATENT DOCUMENTS

| | | |
|---|---|---|
| 2,578,243 | 12/1951 | Hampton . |
| 3,955,727 | 5/1976 | Montgomery . |
| 4,154,382 | 5/1979 | Blackburn . |
| 4,261,491 | 4/1981 | Schroeder ............................ 224/31 |
| 4,460,114 | 7/1984 | Grenier . |
| 4,469,256 | 9/1984 | McEwen . |
| 4,516,705 | 5/1985 | Jackson . |

FOREIGN PATENT DOCUMENTS

| | | |
|---|---|---|
| 1020887 | 12/1957 | Fed. Rep. of Germany ... 224/32 A |
| 943133 | 2/1949 | France ............................. 224/32 A |
| 970863 | 1/1951 | France ............................. 224/32 A |
| 113919 | 2/1945 | Sweden . |
| 121877 | 10/1945 | Sweden . |
| 575260 | 6/1974 | U.S.S.R. . |

*Primary Examiner*—Linda J. Sholl
*Attorney, Agent, or Firm*—Merchant, Gould, Smith, Edell, Welter & Schmidt

[57] ABSTRACT

A cargo binder for use on a cargo carrier on a vehicle having an elastic top panel, which generally extends over the top surface of the carrier, and left and right elastic side panels, which extend downward from the upper surface of the carrier. The top and side panels have at least one axis of elasticity. Primary tensioning mechanisms engage with front and rear portions of the left and side panels to tension the top and side panels at some angle relative to the axis of elasticity, so that a network of tensioning forces are created by the cargo binder to releasably secure the cargo between the secondary tensioning means and the upper surface of the carrier.

14 Claims, 4 Drawing Sheets

CARGO BINDER

FIELD OF THE INVENTION

This invention relates to a cargo binder for use on a cargo carrier, and more specifically to a method and apparatus for creating a network of tensioning forces for releasably securing cargo items to a cargo carrier.

BACKGROUND OF THE INVENTION

Cargo carriers are common on almost all types of vehicles, such as bicycle or motorcycles carriers, or roof carriers on automobiles or campers. These carriers are generally simple frame structures with a generally flat upper surface.

These carriers are a practical method for transporting cargo only if the cargo may be quickly and effectively secured thereto. However, most of such carries require the user to devise a method of securing the cargo. Conventional methods of securing cargo with ropes, elastic cords, and/or a covering material have proven to be time consuming and unreliable for this purpose.

By way of example only, bicycle and motorcycle carriers are generally a simple frame structure attached to the vehicle by a series of struts which extend downward on either side of a wheel and attach to the vehicle proximate the axle of the wheel. A substantial drawback of these carriers is that it is difficult to securely attach items to the flat upper surface of the carrier, while avoiding interference with the exposed wheels.

One attempt to solve this problem involves providing spring-biased arm(s) attached to the upper surface of the carrier for retaining the items. The arm provides a compression force against the items to hold them against the upper surface of the carrier. This solution has a number of drawbacks, including its inability to secure items of unusual shapes and damage caused to items due to the pressure exerted by the arm.

SUMMARY OF THE INVENTION

The present invention relates to a cargo binder for use with a cargo carrier which creates a network of tensioning forces to releasably secure any cargo item to the upper surface of the carrier.

The preferred cargo binder of the present invention comprises an elastic top panel, which generally extends over the top surface of the carrier, and left and right elastic side panels, which extend downward from the upper surface of the carrier. The top and side panels having at least one axis of elasticity. Primary tensioning mechanisms engage with front and rear portions of the left and side panels to tension the top and side panels at some angle relative to the axis of elasticity, so that a network of tensioning forces are created by the cargo binder to releasably secure the cargo to the upper surface of the carrier.

The top and side panels of the cargo binder may be elastic in two orthogonal axes, whereby the warp direction of elasticity is parallel to the longitudinal plane of the upper surface and the side stretch direction of elasticity is perpendicular to the warp direction of elasticity. The primary tensioning mechanisms exert force on the top and side panels at some angle relative to the warp and side stretch directions of elasticity, thereby creating the network of tensioning forces.

A tubular opening is formed along a portion of the perimeter of the top panel and side panels through which the primary tensioning mechanisms are inserted. The primary tensioning mechanisms are allowed to move freely within the tubular member so that the cargo binder may easily deform to the shape of the cargo being carried.

The cargo binder of the present invention may include side pockets for carrying additional items, or a resealable pouch attached to the top panel thereof.

The method of the present invention involves placing a cargo item on the upper surface of the carrier and locating the top panel of the cargo binder generally over the center of the upper surface. The primary tensioning mechanisms are then tensioned into releasable engagement with hooks located proximate the location where the struts attach to the vehicle.

DETAILED DESCRIPTION OF THE PREFERRED EMBODIMENT

Figure 1:
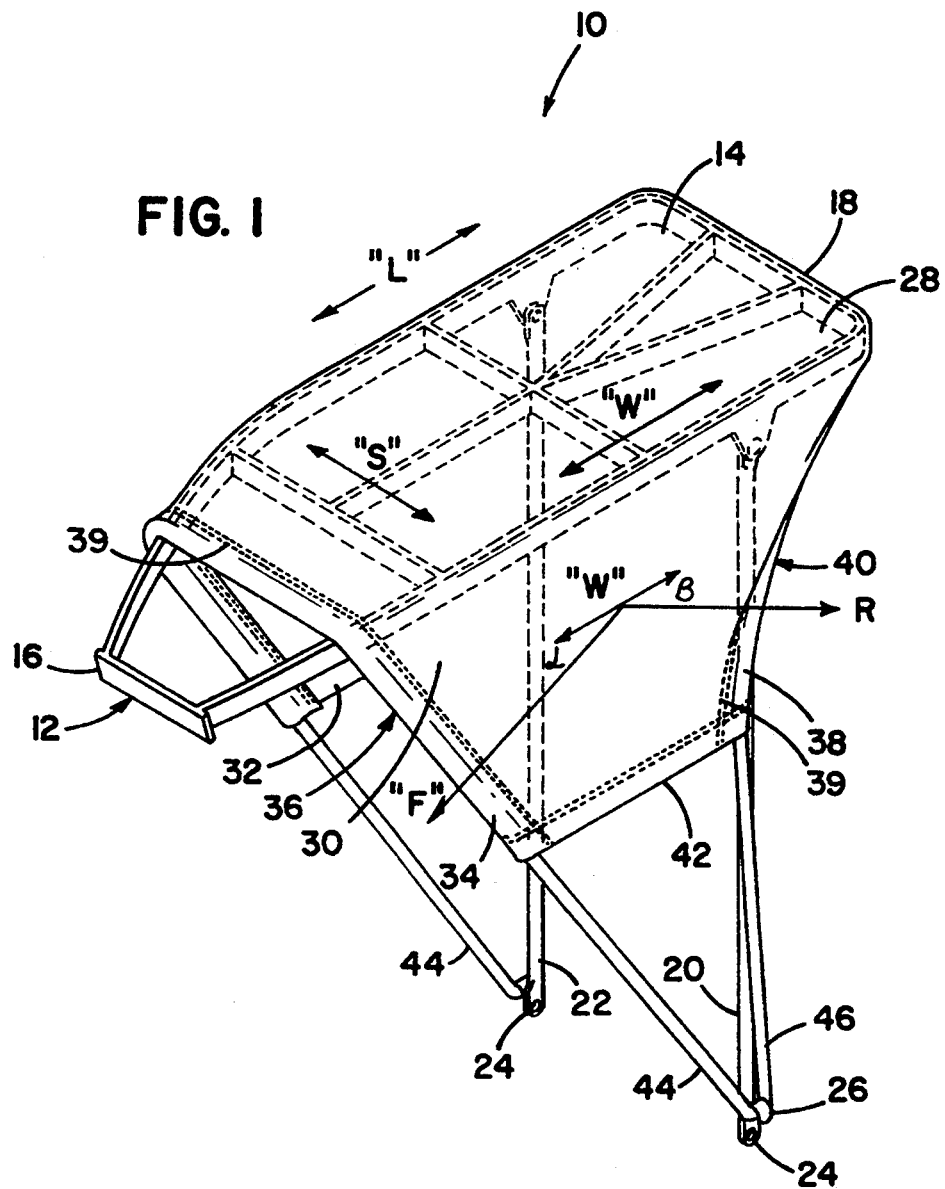
FIG. 1 is a perspective view of the preferred cargo binder engaged with a generic cargo carrier.

FIG. 1 illustrates the first preferred cargo binder 10 of the present invention engaged with a cargo carrier 12. It will be recognized that the illustrated cargo carrier 12 is generally suitable for use on bicycles or motorcycles. However, those skilled in the art will recognize that many configurations of cargo carries may utilize the preferred cargo binder 10 of the present invention and that the general configuration of the cargo carrier 12 illustrated in FIG. 1 is set forth only by way of example.

For example, the cargo carrier may be of a variety of sizes and shapes, and is in no way limited to the generally rectangular upper surface illustrated. It will also be understood that the preferred cargo binder 10 of the present invention is suitable for retaining cargo to carriers on any type of vehicle, including without limit motorcycles, boats, campers, or automobiles.

The cargo carrier 12 illustrated in connection with the first preferred embodiment of the present invention has an upper surface 14, which defines a longitudinal plane "L" that is parallel to the longitudinal axis of the vehicle (not shown). The front edge 16 of the carrier 12 is preferably attached to the vehicle (not shown). Toward a back edge 18 of the carrier 12 are left and right struts 20,22 which extend downward from the upper surface 14, preferably toward the axle of one of the vehicle tires (not shown). At the base of each strut 20,22 are preferably holes 24 for anchoring the struts 20,22 to the vehicle. Hooks 26 may be provided at the base of the struts 20,22 for attaching the cargo binder 10 to the vehicle, or at some other suitable location to create a tensioning force below the upper surface 14, as will be discussed below.

The preferred cargo binder 10 of the present invention has a top panel 28 which preferably extends over the back edge 18 of the upper surface 14. A left side panel 30 and a right side panel 32 extend downward from the top panel 28 along generally vertical planes parallel to the longitudinal plane "L". While the embodiment illustrated in FIG. 1 shows top 28 and side panels 30,32 being constructed of a single piece of material, it will be understood by those skilled in the art that various configurations are possible. For example, the side panels 30,32 may be separate pieces of material attached to the edges of the top panel 28. Alternatively, the side panels 30,32 may be attached to the top panel 28 only along the perimeter of the cargo binder 10, thereby providing an expandable slit between the top panel 28 and the side panels 30,32.

A front tubular member 34 is preferably formed along the front edge 36 of the panels 30,32. Likewise, a rear tubular member 38 is preferably formed along the rear edge 40 of the cargo binder 10. The tubular members 34,38 are preferably formed by folding the edge of the panel material under and stitching 39 the edge of the folded material to the panels. In the preferred embodiment, the tubular members 34,38 extend to a bottom edge 42 of the side panels 30,32.

A front shock cord 44 may be inserted through the front tubular member 34. Likewise, a rear shock cord 46 may be inserted in the rear tubular member 38. In the preferred embodiment discussed herein, the front and rear shock cords 44,46 are a single piece of shock cord joined to form a continuous loop. It will be understood by those skilled in the art that variety of tensioning means may be substituted for the shock cords 44,46 discussed herein. For example, numerous elastic or rubberized materials formed into elongated cord members may be substituted for the shock cords 44,46.

The preferred shock cords 44,46 of the present invention comprises a series of rubber fibers surrounded by a nylon mesh. The preferred embodiment disclosed utilizes a shock cord with a 3/16" diameter, although it will be understood that various diameter shock cords can be used with the present invention in order to increase or decrease the strength and holding capacity of the cargo binder 10. Generally, $\frac{1}{8}"$ to $\frac{1}{4}"$ shock cords are preferred.

The top panel 28 and side panels 30,32 are preferably constructed of an elastic material which provides two axes of elasticity (four-way stretching). Examples of materials that are suitable for this purpose include cotton/poly/Lycra ® fabrics and nylon/Spandex ® materials. While it will be understood that various elastic materials are suitable for this purpose, the preferred embodiment utilizes model 8050 Spandex ® material containing approximately 10% Lycra ® nylon fibers. It will be understood that materials with only one axis of elasticity may be used.

The preferred four-way stretching of the panels 28,30,32 is defined by a warp stretch axis "W" and a side stretch axis "S". The warp direction of stretch is preferably parallel to the longitudinal plane "L" of the cargo carrier 10. The preferred material has a warp stretch capacity of 150-200% of the total length and a side stretch capacity of 85-200% of the total length. It will be understood by those skilled in the art that the panels 28,30,32 of the preferred cargo binder 10 can be coated with a variety of materials to make them water repellant. One such material is Darlexx ® available from Darlington Mills, R.I.

The shock cords 44,46 are attached to the cargo carrier at single points on the hooks 26. It will be understood that the shock cords 44,46 may be anchored to any suitable point below the upper surface 14. Consequently, the front shock 44 cord tensions the cargo binder 10 generally along an axis "F" and the rear shock cord 46 tensions the cargo binder 10 generally along an axis "R". In the preferred embodiment, the tension force "F" is at some angle α with respect to the "W" axis and the tension force "R" is at some angle β with respect to the "W" axis. The tension forces "F" and "R" created by the shock cords 44,46 and the orthogonal warp and side stretch forces "W" and "S" created by the elastic material of the top 28 and side panels 30,32 form a network of tension forces which can quickly and securely retain virtually any shaped item to the carrier 12.

Although σ and β are illustrated in the drawing as acute angles, it will be understood that they may also be obtuse angles, while still creating the necessary network of forces with respect to the warp and side stretch forces. For example, a cargo carrier on the roof of a van or automobile may have a series hooks, rather than the single hooks 26 on each side of the carrier, for retaining the shock cords at an obtuse angle relative to the warp axis. In particular, the front and rear edges of the side panels may be angled away from the base of the cargo carrier 12, so that the side panels are wider at the bottom side edge 42 than at the top edge.

Figure 3:
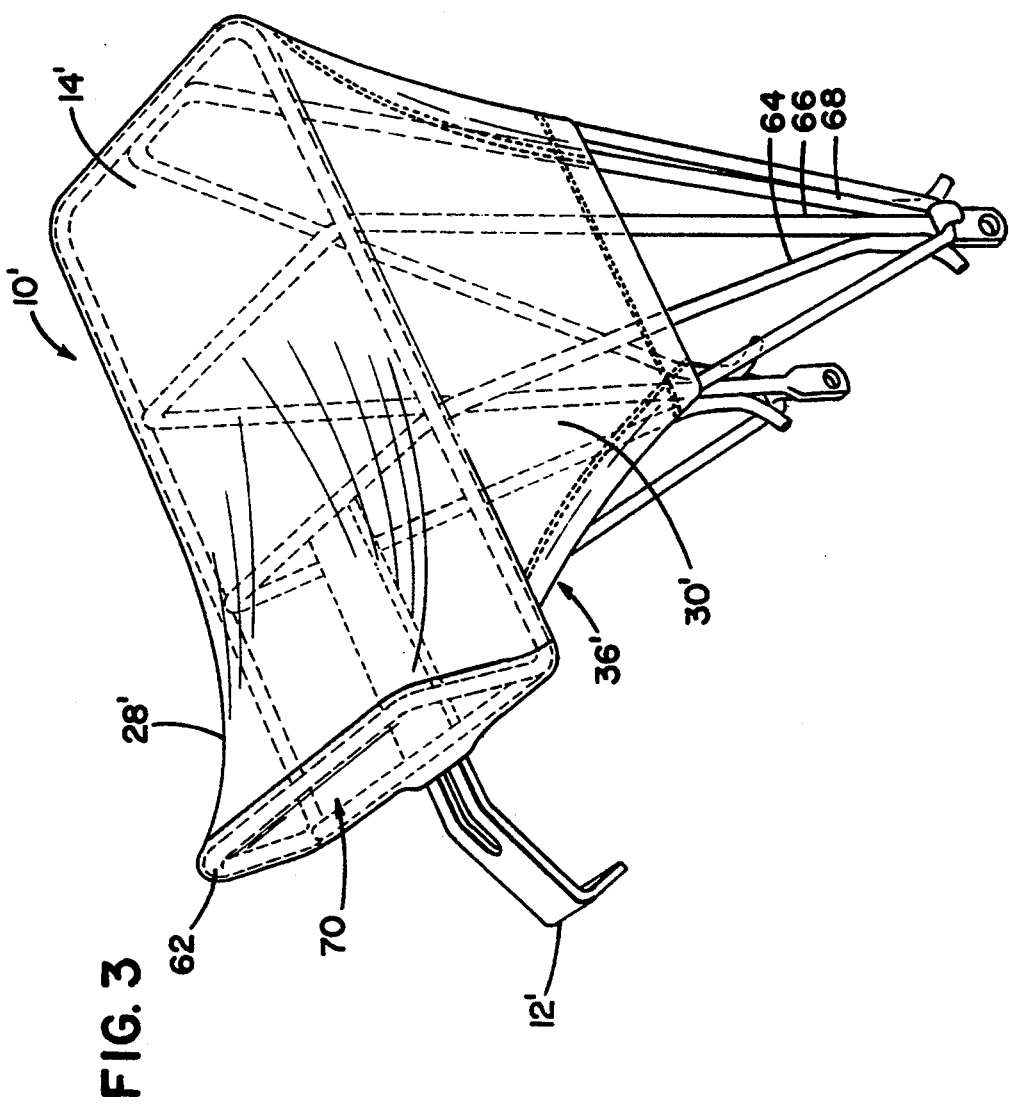
FIG. 3 is a second preferred cargo binder of the present invention engaged with a generic cargo carrier.

As is seen in FIG. 1, the rear tubular member 38 is stitched to create a generally curved edge along the rear edge 40 of the cargo binder 10. The curved shape of the rear edge 40 enhances the force "R" generated by the rear shock cord 46. As is illustrated in FIG. 3, the front edge 36' of the side panels 30',32' may also be curved to enhance the tension force "F". Therefore, the warp and side stretch elasticity of the panels 28,30,32 provide horizontal and vertical tension on the cargo binder 10 along the "W" and "S" axes, respectively, while the front and rear shock cords 44,46 simultaneously provide tension on the cargo binder 10 at angles σ and β with respect to the horizontal axis "W".

The preferred cargo binder 10 of the present invention is designed so that the top panel 28 and side panels 30,32 are in a generally relaxed state when no cargo is attached to the carrier 12. That is, only a small portion of the elastic potential of the panel material is used to retain the cargo binder 10 to the carrier 12 until needed.

It should be noted that the side panels 30,32 of the cargo binder 10 illustrated in FIG. 1 do not extend all the way to the hooks 26. Rather, a bottom side edge 42 of the panels 30,32 are formed approximately halfway between the upper surface 14 of the cargo carrier 12 and the hooks 26. It will be understood by those skilled in the art that it is possible to increase or decrease the size of the side panels 30,32 depending on the type of cargo to be carried.

Figure 2:
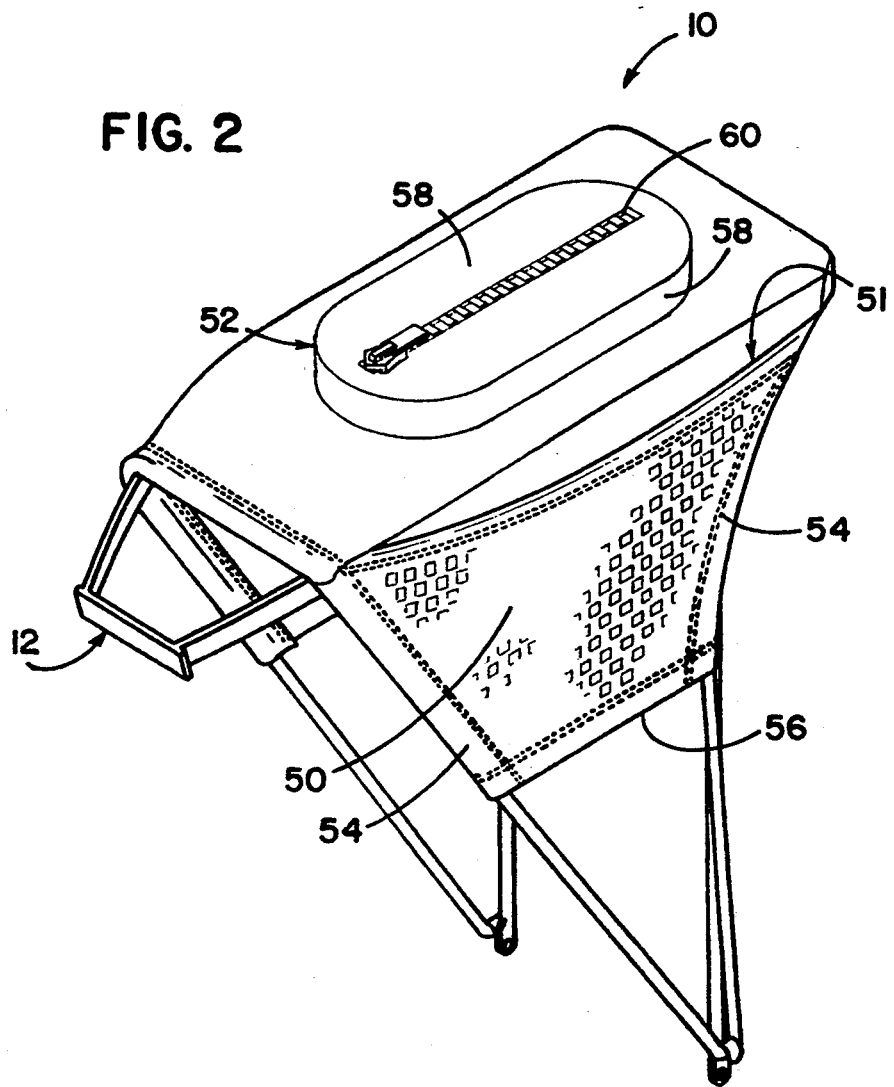
FIG. 2 is an alternate preferred cargo binder containing side pockets and a resealable pouch.

FIG. 2 illustrates an alternate embodiment of the preferred cargo binder which has at least one side pocket 50 and a top pouch 52. The side pocket 50 is constructed by attaching a piece of preferably elastic material to the side edges 54 and bottom edges 42 of the side panels 30,32. The top edge 56 of the side pocket 50 is not attached to the side panels 30,32, thereby forming an opening 51 into which additional cargo items can be stored.

The pouch 52 may be formed from a plurality of panels 58 which define a closed space. In the preferred embodiment illustrated in FIG. 2, access to the closed space is provided by a zipper 60. It will be understood by those skilled in the art that various sealing means are possible, such as Velcro ®, snaps, or buttons.

FIG. 3 illustrates the second preferred embodiment of the cargo binder 10' of the present invention. The cargo carrier 12' illustrated in FIG. 3 has a vertical member 62 to aid in securing items to the upper surface 14'. This alternate cargo carrier 12' also has three support struts 64,66,68 which extend downward from the upper surface 14'. A front panel 70 is provided on the cargo binder 10' to enclose the vertical member 62. The front panel 70 may be attached to the top panel 28', or alternatively, the top panel 28' and front panel 70 may be formed from a single piece of material.

As with the cargo carrier 12 illustrated in FIG. 1, those skilled in the art will recognize that the general configuration of the cargo carrier 12' illustrated in FIG. 3 is set forth only by way of example. For example, the cargo carrier 12' may have a series of one or more vertical members around the perimeter thereof, similar to the conventionally roof carriers found on automobiles and campers.

Figure 4:
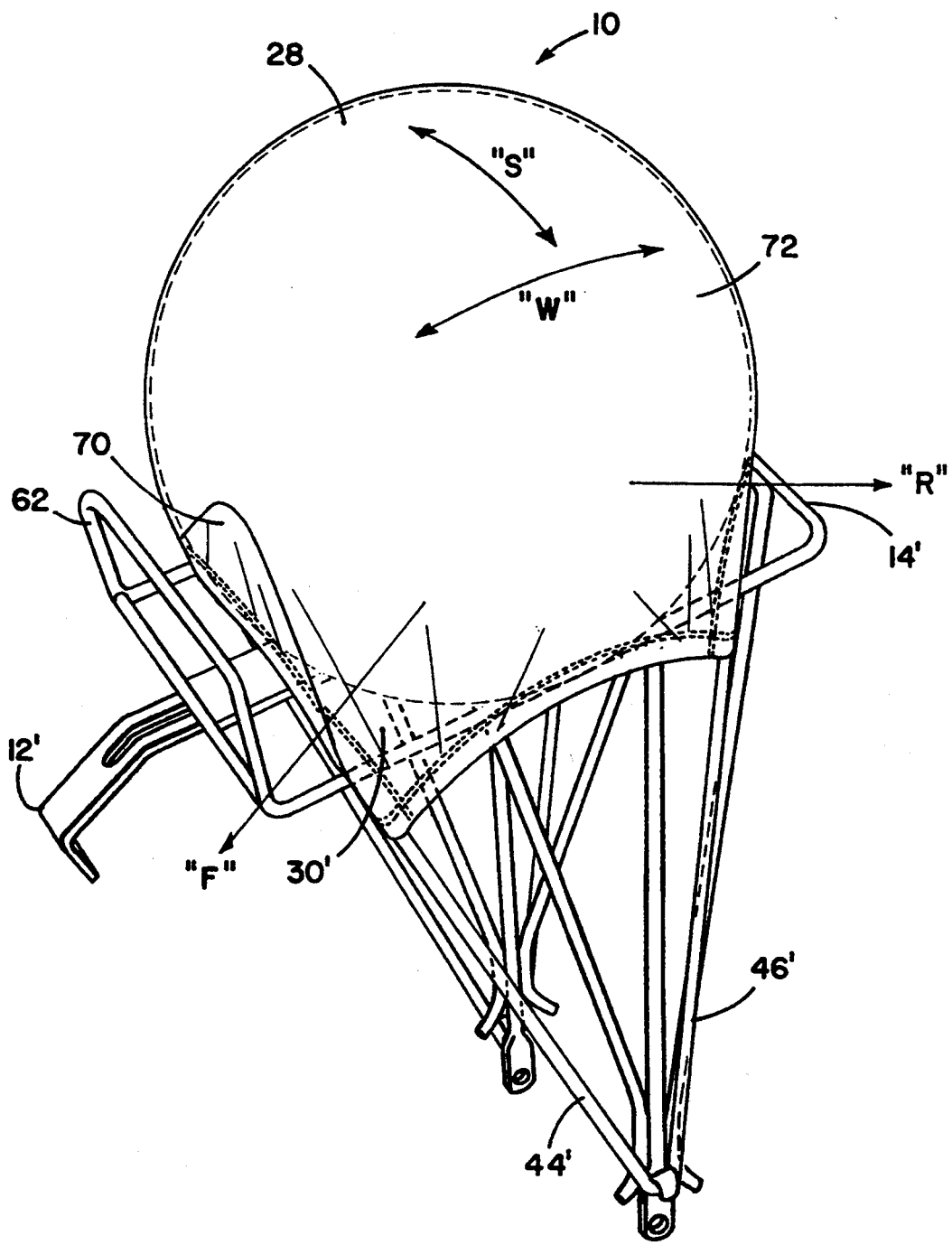
FIG. 4 is a second preferred cargo binder of the present invention retaining a large spherical object to the upper surface of a cargo carrier.

FIG. 4 illustrates the second alternate embodiment of the present invention securing a spherical cargo item 72 to the cargo carrier 12'. The top 28' and side panels 30',32' conform to the shape of the spherical item 72 along the warp "W" and side "S" stretch axes. Because of the size of the cargo item 72, the front panel 70 of the cargo binder 10' lifts off the vertical member 62 of the cargo carrier 12' Also, the side panels 30' 32' of the cargo binder 12' moved upward proximate to the level of the upper surface 14' of the cargo carrier 12', while still retaining the sides of the cargo item 72. It will be noted that as the warp stretch increases, the side stretch forces and shock cords compensate in the vertical direction.

In the stretched position, the front 44' and rear 46' shock cords are under increased tension. This increased tension generates a corresponding increase in the forces generated by the panels 28' ,30' ,32' along the "W" and "S" directions, and along "F" and "R" at some angle relative to the axes "W" and "S". In this fashion, the network of forces created by the cargo binders 10' encompass the cargo 72 and securely retains it to the carrier 12'.

It will be understood by those skilled in the art that the present invention is not limited to the examples discussed above, but may be changed or modified without departing from the spirit or scope of the invention. It will be understood by those skilled in the art that a wide variety of cargo carriers are amenable to the cargo binder of the present invention. Further, it will be recognized that the warp and side stretch directions of the panels may be reversed in order to carry cargo items of a particular configuration. Finally, the side panels can be lengthened or shortened while still achieving the results sought by the present invention.

What is claimed is:

1. A cargo binder for use on a cargo carrier on a vehicle, the vehicle having left and right sides, the carrier having an upper surface defining a longitudinal plane and having front, back, and side edges, the upper surface being attached to the vehicle at a first location, the carrier further having left and right side struts connecting the upper surface to the vehicle at second and third locations, respectively, the side struts defining left and right generally vertical planes along the left and right sides of the vehicle, the cargo binder comprising:

secondary tensioning means for securing cargo to the upper surface of the carrier, the secondary tensioning means comprising an elastic top panel for generally extending over the upper surface of the carrier, and left and right elastic side panels attached to the top panel extending along the left and right vertical planes, respectively, the top and side panels having at least one axis of elasticity, the left and right side panels having front and rear portions generally extending toward the second and third locations, respectively;

primary tensioning means engaged with the forward and rear portions of the left and right side panels for tensioning the forward and rear portions of the left and right side panels at some angle relative to the axis of elasticity;

a tubular opening containing a shock cord formed along a portion of a perimeter of the secondary tensioning means and the primary tensioning means, the primary tensioning means being interconnected with the secondary tensioning means along a portion of the perimeter so that the shock cord may move freely within the tubular member when cargo items are located between the upper surface and the secondary tensioning means; and attachment means proximate the second and third locations for releasably retaining the primary tensioning means thereto, so that cargo may be releasably secured between the secondary tensioning means and the upper surface of the carrier.

2. The apparatus of claim 1 wherein the secondary tensioning means comprises a single sheet of elastic material.

3. The apparatus of claim 1 wherein the secondary tensioning means is elastic in a warp direction orthogonal to a side stretch direction.

4. The apparatus of claim 3 wherein the warp direction is generally parallel to the longitudinal plane and the side stretch direction is generally perpendicular to the warp direction.

5. The apparatus of claim 3 wherein the elasticity of the secondary tensioning means is greater in the warp direction than in the side stretch direction.

6. The apparatus of claim 1 wherein a portion of the top panel extends beyond at least one edge of the upper surface.

7. The apparatus of claim 1 wherein the primary tensioning means includes a shock cord.

8. The apparatus of claim 1 wherein the carrier includes a vertical surface extending upwardly from the front edge thereof and the secondary tensioning means are contoured to extend over the vertical surface.

9. The apparatus of claim 1 wherein the carrier includes hook means proximate the second and third location for releasably retaining the primary tensioning means.

10. The apparatus of claim 1 further including pocket means located on at least on of the side panels, the pocket means comprising a pocket panel having a top edge and side edges, the side edges being attached to the front and rear portions of the side panels so that the top edge of the pocket panel defines an opening through which cargo items may be inserted into the pocket means.

11. The apparatus of claim 1 further including pouch means attached to the top panel, the pouch means comprising a plurality of pouch panels defining a closed space and a resealable opening in the pouch means through which cargo items may be inserted into the pouch means.

12. A cargo binder for use on a cargo carrier on a vehicle, the vehicle having left and right sides, the carrier having an upper surface defining a longitudinal plane and having front, back, and side edges, the upper surface being attached to the vehicle at a first location, the carrier further having left and right side struts connecting the upper surface to the vehicle at second and third locations, respectively, the side struts defining left and right planes generally perpendicular to the longitudinal plane along the left and right sides of the vehicle, the cargo binder comprising:

secondary tensioning means for securing cargo to the upper surface of the carrier, the secondary tensioning means comprising an elastic top panel for generally extending over the upper surface of the carrier, and left and right elastic side panels attached to the top panel extending along the left and right vertical planes, respectively, the top and side panels being elastic in the directions of two mutually orthogonal axes, at least one of the axes being parallel to the longitudinal plane of the upper surface, the left and right side panels having front and rear portions generally extending toward the second and third locations, respectively;

primary tensioning means engaged with the forward and rear portions of the left and right side panels for tensioning the forward and rear portions of the left and right side panels at some angle relative to the orthogonal axes;

a tubular opening containing a shock cord formed along a portion of a perimeter of the secondary tensioning means being interconnected with the secondary tensioning means along a portion of the perimeter so that the shock cord may move freely within the tubular member when cargo items are located between the upper surface and the secondary tensioning means; and attachment means proximate the second and third locations for releasably retaining the primary tensioning means thereto, so that a network of tensioning forces are created by the cargo binder to releasably secure the cargo between the secondary tensioning means and the upper surface of the carrier.

13. A method for using a cargo binder for use on a cargo carrier on a vehicle, the vehicle having left and right sides, the carrier having an upper surface defining a longitudinal plane having front, back, and side edges, the upper surface being attached to the vehicle at a first location, the carrier further having left and right side struts connecting the upper surface to the vehicle at second and third locations, respectively, the side struts defining left and right generally vertical planes along the left and right sides of the vehicle, comprising the steps of:

(a) providing a cargo binder with secondary tensioning means for securing cargo to the upper surface of the carrier, the secondary tensioning means comprising an elastic top panel for generally extending over the upper surface of the carrier, and left and right elastic side panels attached to the top panel extending along the left and right vertical planes, respectively, the top and side panels having at least one axis of elasticity, the left and right side panels having front and rear portions generally extending toward the second and third locations, respectively, primary tensioning means engaged with the forward and rear portions of the left and right side panels for tensioning the forward and rear portions of the left and right side panels at some angle relative to the axis of elasticity, a tubular opening containing a shock cord formed along a portion of a perimeter of the secondary tensioning means and the primary tensioning means, the primary tensioning means being interconnected with the secondary tensioning means along a portion of the perimeter so that the shock cord may move freely within the tubular member when cargo items are located between the upper surface and the secondary tensioning means, and attachment means proximate the second and third locations for releasably retaining the primary tensioning means thereto;

b) locating a cargo item on the upper surface of the carrier;

c) locating the cargo binder over the cargo item so the top panel is generally centered over the upper surface; and d) tensioning the primary tensioning means to releasably engage with the carrier proximate the second and third locations, so that a network of tensioning forces are created by the cargo binder to releasably secure the cargo between the secondary tensioning means and the upper surface of the carrier.

14. A cargo binder for use on a cargo carrier on a vehicle, the vehicle having left and right sides, the carrier having an upper surface defining a longitudinal plane and having front, back and side edges, the upper surface being attached to the vehicle at a first location, the carrier further having left and right side struts connecting the upper surface to the vehicle at second and third locations, respectively, the side struts defining left and right generally vertical planes along the left and right sides of the vehicle, the cargo binder comprising:

secondary tensioning means for securing cargo to the upper surface of the carrier, the secondary tensioning means comprising an elastic top panel for generally extending over the upper surface of the carrier, and left and right elastic side panels attached to the top panel extending along the left and right vertical planes, respectively, the top and side panels having at least two axes of elasticity for tensioning in at least two directions, the left and right side panels having front and rear portions generally extending toward the second and third locations, respectively;

primary tensioning means directly engaging with the forward and rear portions of the top, left and right side panels for tensioning the forward and rear portions of the left and right side panels at some angle relative to the at least two axes of elasticity; and attachment means proximate the second and third locations for releasably retaining the primary tensioning means thereto, so that cargo may be releasably secured between the secondary tensioning means and the upper surface of the carrier.

* * * * *

UNITED STATES PATENT AND TRADEMARK OFFICE
CERTIFICATE OF CORRECTION

PATENT NO. : 5,350,093

DATED : September 27, 1994

INVENTOR(S) : Shawn M. Sheely

It is certified that error appears in the above-identified patent and that said Letters Patent is hereby corrected as shown below:

```
Column 7, line 29,  insert --and the primary tensioning
                    means, the primary tensioning
                    means-- after the word "means".
```

Signed and Sealed this

Eleventh Day of April, 1995

*Attest:*

BRUCE LEHMAN

*Attesting Officer*     *Commissioner of Patents and Trademarks*